March 3, 1970
H. L. MILLER
3,498,461
FLUID FILTER
Original Filed Oct. 14, 1965
2 Sheets-Sheet 1
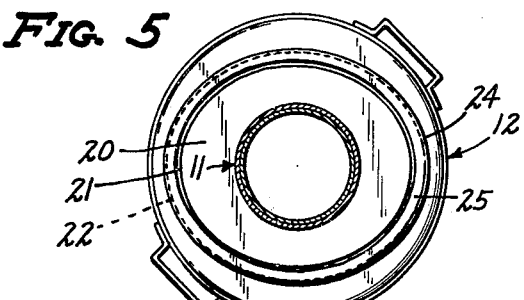
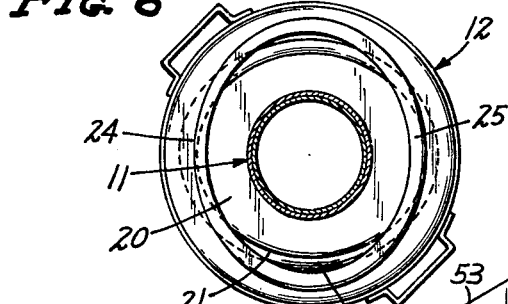
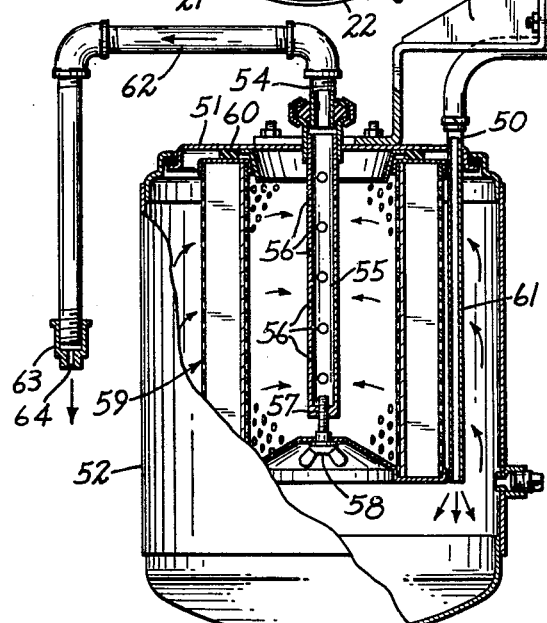
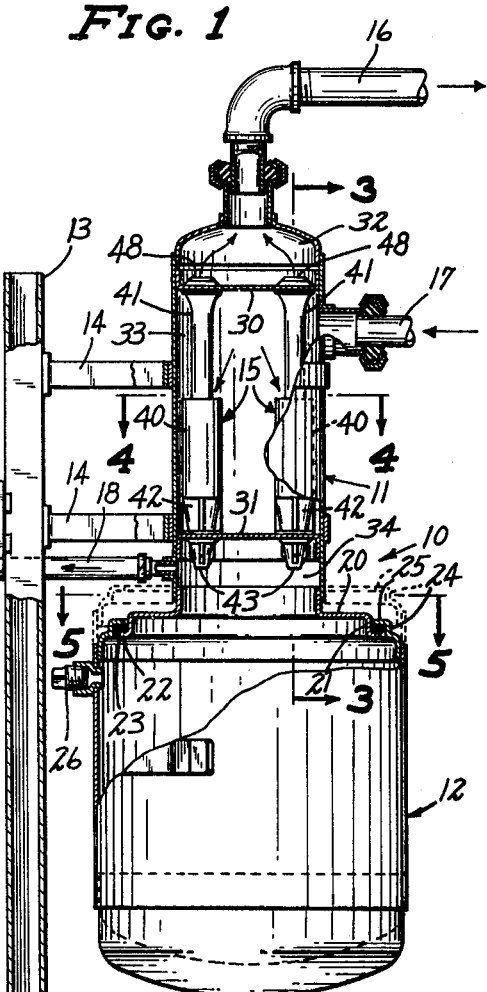
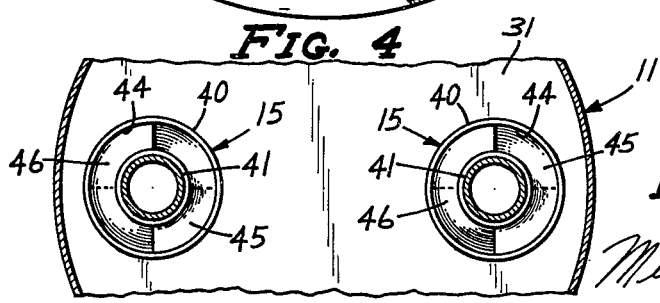
INVENTOR.
HAROLD L. MILLER
BY
Merchant, Merchant & Gould
ATTORNEYS

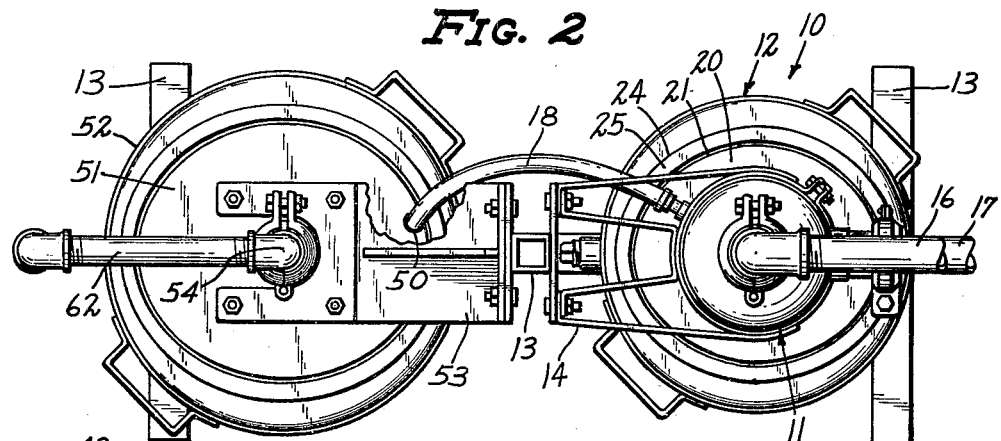
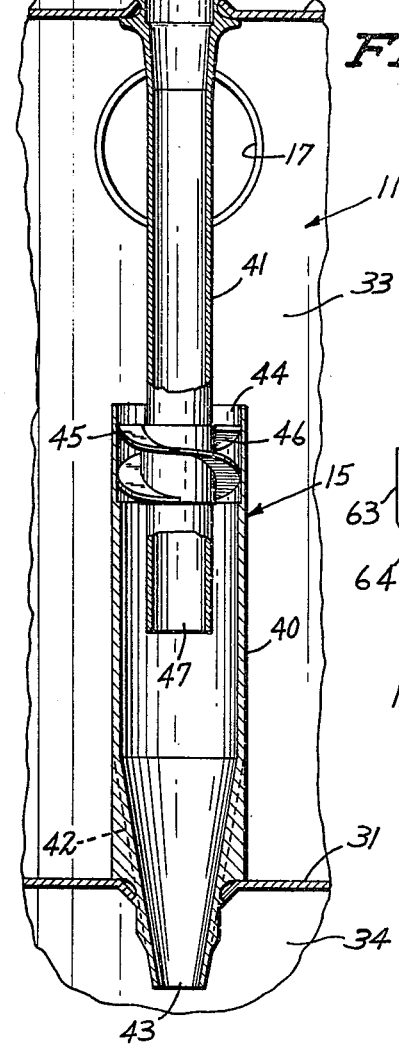
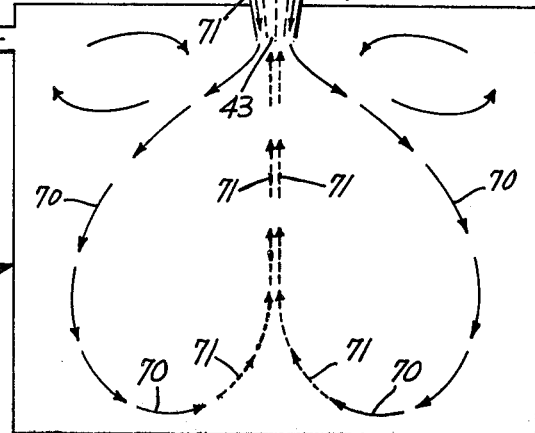

United States Patent Office

3,498,461
Patented Mar. 3, 1970

3,498,461
FLUID FILTER
Harold L. Miller, 3440 Dupont Ave. S., Apt. 103,
Minneapolis, Minn. 55408
Continuation of application Ser. No. 496,089, Oct. 14,
1965. This application Oct. 30, 1968, Ser. No. 778,358
Int. Cl. B01d 43/00
U.S. Cl. 210—253   10 Claims

ABSTRACT OF THE DISCLOSURE

A centrifugal fluid filter with a quickly replaceable particle collection container at the bottom thereof and an underflow having a restriction therein to restrict the fluid flow to a value sufficient to reduce the re-entrainment in the centrifugal filter below an undesirable amount, said underflow passing through a fluid pervious filter element to further remove any foreign particles therein.

---

This application is a continuation of application No. 496,089 filed Oct. 14, 1965, now abandoned.

This invention pertains to a fluid filter and more particularly to a centrifugal fluid filter with quickly replaceable particle collection containers and an underflow with a restriction therein for regulating the amount of re-entrainment of foreign particles within the particle collection container.

The present device is utilized in separating foreign particles, such as bits of metal and the like, from fluids, which for example may be coolants and the like. In metal working and many other types of industrial grinding machines, drills, and many other types of machines which operate at high speed or on exceptionally hard materials utilized a steady stream of coolant to keep the article upon which the machine is operating cool and to flush away loose particles of material. Since the machine is breaking loose bits of material the coolant acquires a great amount of foreign particles therein once it is used. Therefore, it is common practice to filter the coolant before recirculating it. Filtering the described coolant is an example of one possible use for the present invention, however, the present device may be utilized in almost any industry to clean foreign particles from a fluid.

Basically, the present invention consists of a first housing having an inlet, a filtered fluid outlet, an underflow outlet and a centrifugal filter element therein and includes a second housing operatively attached by a fluid carrying conduit to the underflow outlet and having a pervious filter element therein with a restriction in the conduit to regulate the amount of underflow. In the first housing the input to the centrifugal filter element or elements is in communication with the input to the housing and the outlet of the housing is in communication with the outlet of the centrifugal filter elements. The foreign particles separated from the fluid travel to the bottom of the housing, which is a quickly removable particle collection container.

A second outlet in communication with the particle collection container allows a flow of fluid, which is referred to as an underflow, to enter a second housing having a quickly removable particle collection container at the bottom thereof and a pervious filter element therein. The fluid flows through the previous filter element and out through an outlet where it may flow into a sump or the like for the fluid pressure pump and be reused. The volume and velocity of flow in the second outlet, that is through the pervious filter, is a major factor in determining the life of the pervious filter. The greater the underflow the higher the flow velocities in the second housing and the greater the import and channeling effects on the pervious filter. With lower flow velocities the foreign particles tend to settle in the second housing and do not become embedded in the pervious filter element. The fluid flow in the second outlet, or the underflow, indirectly determines the amount of re-entrainment of foreign particles in the first particle collection container. That is, a greater underflow produces less re-entrainment while a smaller underflow produces greater re-entrainment of foreign particles in the first housing. In addition, the underflow determines the amount of foreign particles carried over to the second housing with a smaller underflow causing less particles to carry over.

A restriction is placed in the underflow, which may be removable or fixed. This restriction limits the amount of underflow to a value which assures the longest possible life to the pervious filter while reducing the re-entrainment of foreign particles below an undesirable amount. The removable restriction provides an advantage in that the same or similar fluid filters may be utilized in systems having greatly differing rates of flow. Thus, the present invention has the advantage of being extremely versatile as well as highly efficient.

It is an object of the present invention to provide a new and improved fluid filter.

It is a further object of the present invention to provide a new and improved fluid filter having a greater useful life between service periods.

It is a further object of the present invention to provide a fluid filter which is highly versatile and efficient.

These and other objects of this invention will become apparent to those skilled in the art upon consideration of the accompanying specification, claims, and drawings.

Referring to the drawings, wherein like characters indicate like parts throughout the figures:

FIG. 1 is a view in side elevation of the present invention, parts thereof broken away and shown in section;

FIG. 2 is a view in top plan;

FIG. 3 is an enlarged sectional view of a single centrifugal filter element as seen from the line 3—3 in FIG. 1;

FIG. 4 is a sectional view as seen from the line 4—4 in FIG. 1 portions thereof broken away;

FIGS. 5 and 6 are sectional views of the particle container illustrating the elliptical cover in the seal and the first step for removal positions as seen from the line 5—5 in FIG. 1; and FIG. 7 is a somewhat schematic flow pattern illustrating the operation of a single centrifugal filter element.

In the figures the numeral 10 generally designates the centrifugal fluid filter housing having an upper substantially cylindrical portion 11 and a lower substantially cylindrical portion 12. The housing 10 is attached to a wall or other supporting device 13 by means of a pair of brackets 14 fixedly attached to the supporting device 13 and the portion 11 of the housing 10. The brackets 14 mount the housing 10 so that the longitudinal axis thereof is substantially vertical. The upper portion 11 of the housing 10 has a substantially smaller diameter than the lower portion 12 and carries a pair of centrifugal filter elements 15 therein. The upper portion 11 also has a filtered fluid outlet 16 at the extreme upper end thereof, a fluid inlet 17 at one side thereof axially spaced slightly above center and a second fluid outlet 18 adjacent the bottom thereof.

The lower portion 12 of the housing 10 is substantially larger than the portion 11 and operates as a removable particle collection container. The lower end of the portion 11 is flanged outwardly at 20 to form an elliptical cover which mates with an elliptical opening in the top of the particle collection container 12. The extreme outer edges of the elliptical shaped flange 20 are turned downwardly at 21 and then flanged radially outwardly again at 22. A rubber O-ring 23 is placed on the upper surface of the outwardly extending flange 22 and serves as a seal between the upper portion 11 and the particle collection container 12. The upper edge of the particle collection container 12 extends upwardly at 24 for a short distance and the extreme edge 25 is flanged radially inwardly to mate with the outwardly flanged edge 22 of the upper portion 11. A drain and plug 26 are illustrated near the upper end of the particle collection container 12.

To remove the particle collection container 12 from the centrifugal filter housing 10 the drain plug 26 is opened to drain the level of the fluid to a point below the opening therein. The particle collection container 12 is then raised vertically to the position illustrated in dotted lines in FIG. 1 and rotated 90°, as illustrated in FIG. 6. After the container 12 is rotated 90° it can be moved slightly to one side or the other along the major axis of the elliptical flange 20 of the portion 11. The container 12 is then tiltted slightly to allow one end of the elliptical flange 20 to emerge from the opening and the container is then moved in the other direction until it is free. To replace the container the preceding steps are simply reversed.

The portion 11 of the housing 10 has a pair of partitions 30 and 31 therein which separate the portion into three vertically overlying chambers 32, which is located at the extreme upper end of the portion 11, 33, which is located centrally therein and 34, which is located at the lower end thereof and in communication with the particle collection container 12. The filtered fluid outlet 16 is in communication with the chamber 32. The fluid inlet 17 is in communication with the chamber 33. The second fluid outlet 18 is in communication with the chamber 34 and the particle collection container 12. The partitions 30 and 31 also operate as means for mounting the centrifugal filter elements 15 vertically within the chamber 33 of portion 11 of the housing 10. Since both of the centrifugal filter elements 15 illustrated in FIG. 1 are similar, the construction and operation of only one will be described in detail.

Referring to FIG. 3 a cross-section of a single centrifugal filter element 15 is illustrated. The centrifugal filter element 15 is comprised of a first tube 40 and a second tube 41. The tube 40 has a circular cross-section with an opening 44 at the upper end and an opening 43 at the lower end thereof. The lower portion 42 tapers gradually inwardly toward the opening 43 in the form of an inverted truncated cone. Thus, opening 43 at the lower end thereof is substantially smaller than the opening 44 at the upper end thereof. The second tube 41 also has a circular cross-section with an opening 47 at the lower end and an opening 48 at the upper end thereof. The outer diameter of the tube 41 is substantially smaller than the diameter of the opening 44 in the tube 40. The tube 41 is mounted by means of a pair of helical members 45 and 46 coaxial with tube 40 so that opening 47 in its lower end is positioned a substantial distance within the opening 44 in the upper end of the tube 40. The helical members 45 and 46 are fixedly positioned between the outer surface of the tube 41 and the inner surface of the tube 40. Each of the members 45 and 46 begins on either side of the tube 41 along a common diameter of the tube 40 and extends approximately 270° to end in a common diameter of the tube 40 which is rotated 90° from the first diameter and spaced vertically therebelow.

The upper end of the tube 41 passes through and is held vertically in place by the partition 30 while the lower end of the tube 40 passes through and is held vertically in place by the partition 31. The opening 48 in the upper end of the tube 41 opens into the chamber 32, the opening 44 in the upper end of the tube 40 opens into the chamber 33 and the opening 43 in the lower end of the tube 40 opens into the chamber 34. While two centrifugal filter elements 15 are illustrated in the present embodiment, it should be understood that only one could be utilized or any desired number, depending upon the characteristics of the fluid (such as viscosity, etc.), size of the foreign particles being filtered, required capacity of the filter, etc.

The second outlet 18 attached to the housing 10 is in communication with an inlet 50 in an elliptical cover 51 which mates with a substantially cylindrical housing 52. Housing 52 is substantially similar to the particle collection container 12 at the bottom of housing 10. The cover 51 is attached to the wall or supporting device 13 by a bracket 53 and the housing 52 can be quickly disengaged from the cover 51 in a manner similar to that explained for the particle collection container 12. The cover 51 also has centrally located therein an outlet 54 with a hollow shaft 55 fixedly attached thereto and extending downwardly into the center of the housing 52. The shaft 55 has a plurality of holes 56 therein for receiving fluid therethrough. The lower end of the shaft 55 has a plug 57 therein which has a threaded hole therethrough for reception of a thumbscrew 58.

A pervious or flow-through filter element 59 has a metal disk-shaped plate at either end thereof with the filtering member in the form of pervious radially spaced metallic cylinders rigidly supported therebetween and pleated filtering material between such cylinders. Filter element 59 has a centrally located hole at the upper end thereof for receiving the shaft 55 therethrough. The upper end of the pervious filter element 59 butts against a resilient gasket 60, which may be affixed to the underside of the cover 51 or the upper side of the filter element 59, and the entire device is held in place by the thumbscrew 58 which is received through a hole in the closed lower end plate of filter 59. Thus, the fluid enters the inlet 50 and passes through a tube 61 attached to the inlet 50 which directs the fluid to the bottom of the housing 52 after which the fluid circulates upwardly and through the sides of the pervious filter element 59. This circulation of the fluid causes large and heavy particles to settle to the bottom of the housing 52. The fluid then passes through the openings 56 in the shaft 55 and out the outlet 54. It should be understood that the pervious filter 59 illustrated is simply one example and many varied embodiments could be utilized and still be within the scope of this invention.

The outlet 54 in the cover 51 of the housing 52 has a conduit 62 attached thereto which carries the underflow back to the pressure source of the fluid, which may be a sump or the like. A restriction 63, illustrated at the end of the pipe 62, may be removably attached by threads or the like or it may be permanently attached thereto. Also, it is not necessary that the restriction 63 be placed at the end of the pipe 62 but it may be placed anywhere in the underflow path. The restriction 63 has an orifice 64 therethrough the size of which is determined by the amount of underflow desired in the system. The area of the orifice 64 is the important dimension and, thus, the diameter of the orifice 64 is made proportional to approximately the square of the flow rate through the inlet 17 and outlet 16. If the inlet 17 of the filter is attached to a fluid system having a different rate of flow, the present filter is quickly adapted to that system by exchanging the restriction 63 for one having a proper orifice 64 therein to give the desired amount of underflow.

In the operation of the filter the fluid flows into the inlet 17 and fills the chamber 33. Fluid is forced under pressure into the opening 44 at the top of the tube 40 and downwardly through the helical members 45 and 46. The helical members 45 and 46 cause the fluid to spiral downwardly in a vortex through the tube 40 and out the bottom opening 43. Once the particle collection container 12 and the lower chamber 34 of the portion 11 are completely filled with fluid the pressure on the fluid spiraling downwardly in the tube 40 causes the spiraling fluid to gradually change directions axially and spiral back up the tube 40 into the tube 41. The upwardly spiraling fluid forms a smaller vortex within the vortex formed by the downwardly spiraling fluid. This can be seen more clearly in FIG. 7. The downwardly spiraling fluid forms a vortex along the innersurface of the tube 40, represented by full line arrows 70, and the upwardly spiraling fluid forms a relatively small vortex in the center of the larger vortex, represented by the dotted line arrows 71. The axial change of direction of the spiraling fluid, or the mass transfer of fluid from the outer vortex to the inner vortex, takes place gradually over the entire tapered length 42 of the tube 40. The inner and outer vortices usually continue past the lower end 43 of the tube 40 and may actually continue to the bottom of the particle collection container 12.

It is highly desirable that the mass transfer of fluid from the outer vortex to the inner vortex take place mostly in the tube 40 and within a small area of the container 12 since the lower portion of the container 12 has settled particles therein which are re-entrained when the adjacent fluid is caused to swirl. The downwardly spiraling fluid 70 in the tube 40 causes the foreign particles to be forced outwardly adjacent the inner surface of the tube 40 where the particles settle downwardly into the particle collection container 12. The clean upwardly spiraling fluid 71 enters the lower end 47 of the tube 41 and passes through the tube 41 into the chamber 32, where it is forced out the outlet 16. Particles that may be re-entrained within the tube 40 and carried into the upwardly spiraling fluid 71 tend to be forced outwardly into the downwardly spiraling fluid 70. Thus, the fluid entering the tube 41 is substantially free of foreign particles.

When the particle collection container 12 and the chamber 34 fill with fluid, some fluid begins to flow out the second outlet 18 into the housing 52. When the housing 52 is completely filled with fluid, the fluid is forced through the pervious filter 59 and out the outlet 54, through the tube 62 and the restriction 63. This flow of fluid is the underflow and the rate of underflow is determined by the size of the orifice 64 in the restriction 63. The underflow through the second outlet 18 reduces re-entrainment of the foreign particles in the fluid by reducing the mass transfer of fluid between the outer vortex 70 and the inner vortex 71 in the particle collection container 12. This phenomenon can be seen more easily by noting the extreme cases.

If there is no underflow in the outlet 18 all of the fluid in the outer vortex 70 which enters the particle collection container 12 through the opening 43 in the bottom of the tube 40 must eventually spiral back into the tube 40 by means of spiral 71 and leave the centrifugal filter element 15 by way of tube 41. In this extreme example there is a maximum of re-entrainment of foreign particles in the particle collection container 12 since the mass transfer of fluid may continue as far down as the bottom of the container 12. At the other extreme the underflow through the outlet 18 is so great that all of the fluid entering the particle collection container 12 through the opening 43 in the bottom of the tube 40 flows through the outlet 18 into the housing 52. In this extreme case there is no re-entrainment of the foreign particles into the filtered fluid in the particle collection container 12 since none of the fluid in the particle collection container 12 spirals back into the centrifugal filter element 15. However, there are a great many foreign particles carried into the housing 52 by the large underflow. These particles strike the pervious filter 59 at relatively high velocities and greatly reduce the useful life thereof. The restriction 63 limits the underflow to a value between the two extremes whereby some mass transfer of fluid between the outer vortex 70 and the inner vortex 71 take place in the particle collection container 12 but the re-entrainment of foreign particles is below some undesirable value. That is, the number of foreign particles in the fluid leaving the outlet 16 are below a harmful level for the type filtering being accomplished. In general the underflow rate is limited to a value in the range of approximately 0.3% to 5.0% of the total flow through the filter for a filter utilized in coolants and the like.

Thus, the present invention provides a number of advantages over the prior art. Because of the helical inlet to the centrifugal filter elements 15 these elements 15 can be positioned relatively close together and, therefore, the entire filter can be made relatively small compared to prior art filters. Because of the restriction 63 placed in the underflow, the present filter can be used under a great number of varied conditions and provides a number of different advantages. For example, if the operator wants the pervious filter 59 to have a long useful life while not placing too stringent a requirement on the filtered fluid at the outlet 16 he can reduce the orifice 64 in the restriction 63 and, thereby, reduce the volume of the underflow. This will decrease the velocity with which the foreign particles strike the pervious filter 59 and greatly increase the life thereof. If an operator desires well filtered fluid at outlet 16 and a long useful life of the pervious filter 59 is not important, he can make the orifice 64 in the restriction 63 larger, thereby, increasing the underflow. In addition to being versatile and compact the present filter is quickly and easily cleaned by simply removing the particle collection container 12 and the housing 52. Both of these containers are quickly and easily removable for cleaning.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:
1. A fluid filter comprising:
(a) an inlet adapted to have fluid under pressure applied thereto;
(b) a filtered fluid outlet adapted to be attached to a device utilizing the filtered fluid;
(c) a centrifugal filter element including a first tube a portion of which is gradually tapered inwardly in the shape of an inverted truncated cone having a larger and smaller opening, a second tube having an outer diameter substantially smaller than the inner diameter of the larger opening of said truncated cone, and helical shaped means substantially contained within the first tube and mounting a portion of said second tube coaxially therein so that one end of said second tube lies adjacent said larger opening of said truncated cone, said helical shaped means forming a helical inlet in said filter element for providing a helical flow of fluid from said larger opening toward said smaller opening in said truncated cone which helical flow gradually changes direction axially and flows into said second tube;
(d) means mounting said filter element with the helical inlet in communication with said inlet and the other end of said second tube in communication with said outlet;
(e) a particle collection container mounted in communication with said smaller opening of said truncated cone of said filter element having some inward and outward helical flow of fluid therein;
(f) a second fluid outlet in communication with said particle collection container having a pervious filter element in the fluid outlet path, the amount of fluid flow through said second outlet varying indirectly with the mass transfer of fluid between the inward helical flow and the outward helical flow in said particle collection container which directly varies re-entrainment of foreign particles; and (g) restricting means positioned in the path of said second outlet to restrict the fluid flow in said second outlet to a value sufficient to reduce the re-entrainment below an undesirable amount, said restricted flow reducing the velocity with which foreign particles strike said pervious filter.

2. A fluid filter substantially as set forth in claim 1 wherein a plurality of centrifugal filter elements are incorporated.

3. A fluid filter substantially as set forth in claim 1 wherein the particle collection container is a relatively large sealed container having an opening in the upper end thereof positioned below the centrifugal filter element so that foreign particles fall from said centrifugal filter element into said container.

4. A fluid filter substantially as set forth in claim 1 wherein the pervious filter element is contained within a second particle collection container having an elliptical opening at the top thereof and a mating elliptical cover with inlet and outlet means therein, said cover having an outwardly extending flange therearound which underlies the edge of said container to seal said container.

5. A fluid filter substantially as set forth in claim 4 wherein the particle collection container in communication with the filter element has an elliptical opening at the top thereof and a mating ellipitcal cover having means thereon for operatively connecting the filter element mounting means and second fluid outlet, said cover having an outwardly extending flange therearound which underlies the edges of said container to seal said container.

6. A coolant filter having a casing, a plurality of centrifugal action separator units mounted in said casing and each unit having an opening for the discharge of contaminants, an inlet to said casing for coolant, an outlet from said casing for clean coolant, an outlet from said casing for contaminated coolant, an inlet in each of said separator units in communication with said casing inlet, a clean coolant outlet in each of said separator units in communication with said casing clean coolant outlet, said separator unit contaminant discharge openings being in communication with said casing outlet for contaminated coolant, a hollow member in sealing relation with the walls of said casing adjacent said latter outlet, an end of said member extending upwardly to adjacent the separator units to receive contaminants from all of said units, and a passageway means providing communication, via the outlet from said casing for contaminated coolant, between the interior and exterior of said casing, the cross section of said passageway being substantially less than any of the contaminant discharge openings of the separator units, thereby providing a restricted pasasge from which contaminants and a small amount of coolant are free to continuously discharge without destroying the back pressure of coolant within said casing.

7. A fluid filter comprising:

(a) a generally cylindrical, hollow filter body having one end thereof open, an inlet therein for the application of pressurized fluid thereto, and a filtered fluid outlet therein adapted to be attached to a device utilizing the filtered fluid;

(b) a centrifugal filter element including a first tube which is gradually tapered inwardly in the shape of a truncated cone adjacent one end to produce a relatively large opening at one end and a relatively small opening at the opposite end, a second tube having an outer diameter substantially smaller than the inner diameter of the large opening of said first tube, and deflecting means attached to said first tube adjacent the large opening and attaching one end of said second tube approximately coaxially therein, said deflecting means forming a generally helical flow of fluid in said first tube from the large opening toward the small opening which helical flow gradually reverses axial direction and flows into the second tube when sufficient fluid pressure is maintained at the small opening of said first tube;

(c) first and second spaced apart partitions affixed in said filter body in generally parallel spaced apart orientations and mounting said filter element in the desired position within said filter body so as to form two chambers in said filter body, said first chamber having the filtered fluid outlet and the other end of said second tube therein, and said second chamber having the inlet and the large opening of said first tube therein;

(d) a chamber forming member sealingly affixed to the open end of said filter body for forming a third chamber in cooperation with the open end of said filter body and said second partition, the small opening of said first tube being positioned in said third chamber by said second partition and said third chamber receiving contaminated fluid from said filter element and providing pressure on the small opening of said first tube to cause reversal of fluid flow in said filter element; and (e) a fluid outlet in communication with said third chamber having means attached thereto for providviding an underflow of fluid from said third chamber while restricting the underflow sufficiently to maintain adequate fluid pressure in said third chamber to cause reversal of fluid in said filter element and the operation of said filter element, the amount of underflow varying indirectly the amount of re-entrainment of foreign particles in said third chamber.

8. A fluid filter as set forth in claim 7 wherein the restricted fluid outlet communicates with the third chamber adjacent the small opening of the first tube of the filter element for carrying a minimum amount of foreign material out of the third chamber with the underflow.

9. A fluid filter as set forth in claim 7 wherein the chamber forming element includes an enlarged removable container for receiving foreign particles separated by the filter element.

10. A fluid filter substantially as set forth in claim 7 wherein the restricted fluid outlet includes a sufficiently small cross sectional area of fluid flow for restricting the amount of flow in the fluid path of the second outlet within the range of approximately 0.3% to 5.0% of the total flow through the filter.

References Cited

UNITED STATES PATENTS 2,378,632   6/1945   Hooker et al. _____ 210—512

REUBEN FRIEDMAN, Primary Examiner

JOHN W. ADEE, Assistant Examiner

U.S. Cl. X.R.

210—260, 261, 322, 512

UNITED STATES PATENT OFFICE
CERTIFICATE OF CORRECTION

Patent No. 3,498,461                                March 3, 1970

Harold L. Miller

It is certified that error appears in the above identified patent and that said Letters Patent are hereby corrected as shown below:

In the heading to the printed specification, lines 3 and 4, "Harold L. Miller, 3440 Dupont Ave. S., Apt. 103, Minneapolis, Minn. 55408" should read -- Harold L. Miller, Minneapolis, Minn., assignor to Donaldson Company, Inc., Minneapolis, Minn. --.

Signed and sealed this 1st day of December 1970.

(SEAL)
Attest:

Edward M. Fletcher, Jr.                          WILLIAM E. SCHUYLER, JR.
Attesting Officer                                      Commissioner of Patents